Feb. 27, 1945.  H. H. COUCH  2,370,149
CAM TYPE GOVERNOR CONTROL FOR MAINTAINING
SYNCHRONIZATION OF GOVERNORS
Filed Feb. 9, 1943  3 Sheets-Sheet 1

INVENTOR
HOWARD H. COUCH
BY
ATTORNEYS

Feb. 27, 1945.  H. H. COUCH  2,370,149
CAM TYPE GOVERNOR CONTROL FOR MAINTAINING
SYNCHRONIZATION OF GOVERNORS
Filed Feb. 9, 1943  3 Sheets-Sheet 2

INVENTOR
HOWARD H. COUCH
BY Edgar W. Anogram
Clade Krontz
ATTORNEYS

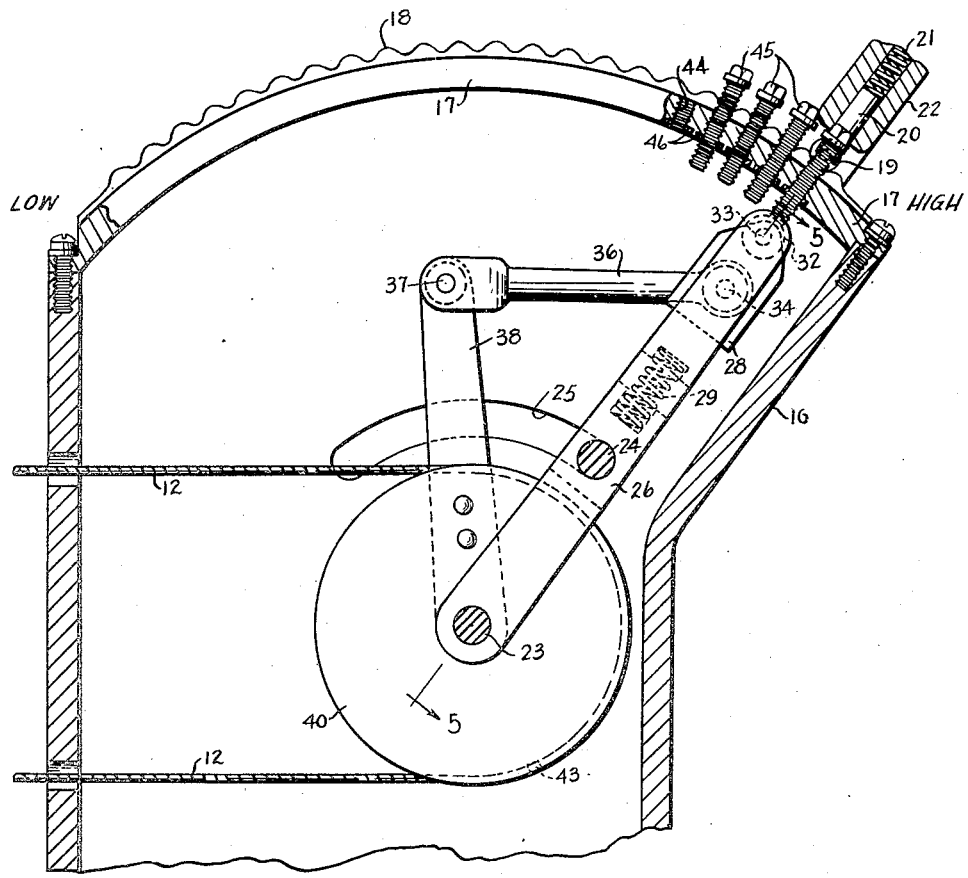

Patented Feb. 27, 1945

2,370,149

UNITED STATES PATENT OFFICE 2,370,149

CAM TYPE GOVERNOR CONTROL FOR MAINTAINING SYNCHRONIZATION OF GOVERNORS

Howard H. Couch, Wright Field, Ohio

Application February 9, 1943, Serial No. 475,295

9 Claims. (Cl. 60—97)

(Granted under the act of March 3, 1883, as amended April 30, 1928; 370 O. G. 757)

The invention described herein may be manufactured and used by or for the Government, for governmental purposes, without the payment to me of any royalty thereon.

This invention relates to a novel means for synchronizing a plurality of prime movers such as aircraft engines, each of which is provided with a governor, by providing compensating mechanism to take care of the differences in characteristics of the respective governing mechanisms so that changes in speed of the prime movers due to variation in load will be corrected the same amount for each engine and thereby maintain synchronism as to speed.

Synchronizers of the well-known differential type have been proposed particularly for aircraft engines, but have not gone into extensive use because of the prohibitive weight of the mechanical or electrical repeater systems necessary to transmit the respective engine speeds to the speed comparing mechanism, which then reacts through additional mechanism on the engine speed control means. Further, the electrical or mechanical differential synchronizers heretofore employed have introduced hunting into the respective engine governing systems.

As is well known in the art, the rotational speeds of the engines on multi-engine aircraft are governed by control of the engine load through the medium of variable pitch propellers, the propeller pitch being controlled by engine driven speed responsive mechanism, generally of the centrifugal type. The centrifugal speed responsive mechanism or governor for each propeller is provided with the usual speeder spring, the loading of which determines the normal or equilibrium speed of the associated engine. The governor speeder spring loading is generally manually controlled by the pilot.

If two or more engines provided with variable pitch propellers of identical type and having identical type governors, manually set for the same speed, are subjected to the same change in load, the engine speeds both before and after the change in load will not be the same. This lack of synchronism is due to variation in frictional forces, hydraulic leakage and numerous other sources, because of variation in the dimensions of the corresponding parts of the propeller pitch adjusting mechanisms arising because of the necessary tolerances in manufacture. One considerable source of error is in the variation in characteristics of the respective governor speeder springs which are by their very nature practically impossible to construct with exactly matched characteristics, although the tests have shown that the characteristics of any particular governor speeder spring and of the governor as a whole appear to change but very little due to service use, which fact is primarily responsible for the good results obtained from the present invention.

The applicant, in conducting research on the synchronizing problem, determined that where properly constructed, very little if any appreciable errors were created by the remote control means for the governors, so that a compensating means acting on the governor spring of each governor to so load the spring that the respective engine speeds would be identical was determined as being a possible solution of the problem. An adjustable cam device was then constructed for a multi-motored airplane propeller pitch control so that the cam ordinates could be varied, and the device included a cam follower and associated linkage interposed between the governor spring loading means and the notched sector and lever setting mechanism thereof, so that with all of the setting levers in the corresponding notch, the rise of the individual cams at that point could be adjusted to vary the movement of the respective associated governor setting transmission, so that the propellers during flight were brought into synchronism as to speed, this condition being observed by means of a Rotoscope, a well-known mechanically driven stroboscope. The cams were adjusted for each notch setting of the setting levers in a similar manner. The airplane with the above-described synchronizing equipment was flight tested over a considerable period of time and the results were very satisfactory, the engine speeds being held in synchronism within $+2$ R. P. M., results falling within synchronizing limits specified for the usual type of synchronizing apparatus, yet adding only a few pounds additional weight to the airplane. The novel synchronizing structure can be applied to any governor controlled variable pitch propeller whether of the electric, hydraulic or mechanical type and can be applied to synchronizing other types of prime movers.

It is therefore an object of the invention to provide a means for synchronizing a plurality of governor controlled prime movers or the like—in which the governor speed settings are varied by adjustment of a governor modifier—comprising providing an individual cam means associated with each respective modifier adjusting means, the cam means being so constructed that when each modifier adjusting means is set to a predetermined speed setting position, the associated modifiers will be respectively adjusted to maintain the equilibrium speed settings of the governors identical, whereby the governors may provide the requisite control to maintain the prime movers in synchronism as to speed.

It is a further object of the invention to provide in a governing system for a prime mover of the type in which the prime mover is provided with a speed control means actuated by a governor having a modifier and said modifier having an adjusting means; of a cam interposed between said adjusting means and said modifier for varying the loading of the modifier so that the speed setting of the governor coincides with a predetermined value in predetermined setting positions of said adjusting means.

Another object of the invention is the provision for synchronizing a plurality of governor controlled prime movers each having a governor modifier comprising determining the residual error in speed of each particular prime mover from a selected reference speed for corresponding speed settings of the respective governor modifiers, and constructing compensating means associated with each governor modifier and the setting means therefor operative to act on the modifier to correct the residual error in speed, whereby in each corresponding speed setting of the governors, the prime mover speeds will remain constant or vary an equal amount due to change in load on the prime movers.

Other objects of the invention will appear by reference to the detailed description hereinafter given and to the appended drawings in which:

Fig. 4 is a sectional view of the control device taken on line 4—4 of Fig. 3 and;

Figure 1:
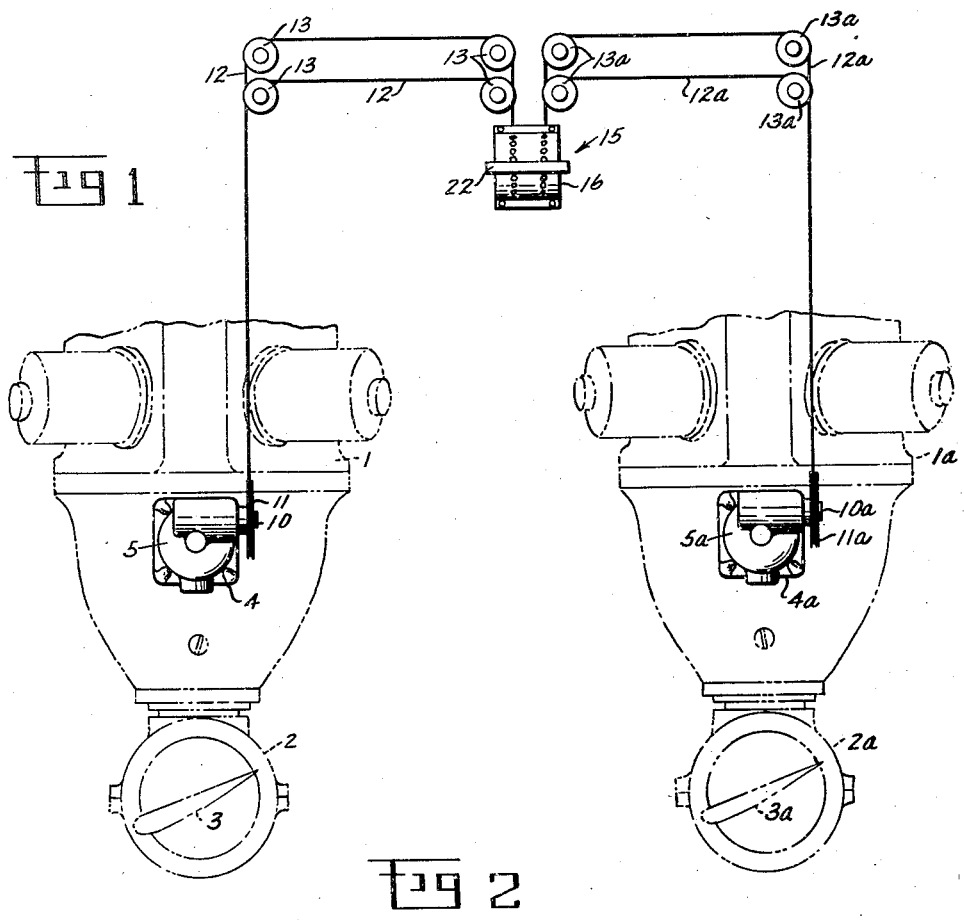
Fig. 1 is a schematic illustration of a multi-engine synchronizer installation in accordance with the invention.

Referring now to Fig. 1, the reference numeral 1 indicates a conventional aircraft engine shown in dotted lines which is adapted to drive a propeller 2 having blades 3, the pitch of which is adapted to be varied to vary the engine speed through, for example, any of the well-known hydraulic or electric variable pitch control mechanisms, the propeller 2 and blades 3 also being indicated in dotted lines. The propeller pitch control mechanism is adapted to be controlled by means of a conventional governor assembly, generally indicated by the reference numeral 4, the governor being enclosed in a housing 5 and incorporating a modifier of well-known construction actuated by means of a shaft 10 rotated by the pulley 11 through a continuous band or cable 12 which passes over guide pulleys 13 and is actuated by manual control system, generally indicated by the reference numeral 15, located within the housing 16, and actuated by means of a yoke or control handle 22. A second engine, propeller governing mechanism and control therefor is indicated in Fig. 1 by the same reference numerals as applied to engine 1 except for the addition of the subscript letter *a*, the governors of each engine being simultaneously controlled by actuation of the control handle 22 of the manual control 15, which incorporates the novel features of the subject invention.

Figure 2:
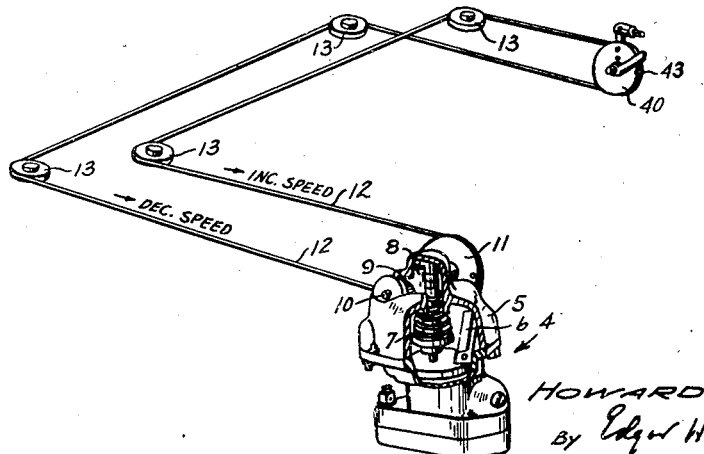
Fig. 2 is an illustration partly in section of a governor modifier of the device of Fig. 1.

By reference to Fig. 2, one of the governors of the device of Fig. 1 is illustrated in which the governor weights 6, rotatable by the engine, are housed within the casing 5 and are adapted to actuate valve mechanism not shown in opposition to the loading of a conventional speeder spring 7 which resists the outward movement of the weights 6, the connection between the weights and speeder spring not being shown for clarity of illustration. The speeder spring at its upper end engages a shiftable abutment 8 which is provided with ratchet teeth, not shown, which mesh with a gear 9 rotatable with a shaft 10 to which the pulley 11 is secured. As the pulley 11 is rotated in one direction or the other, the shiftable abutment 8 is elevated or depressed to thereby vary the loading of the speeder spring 7, and hence determines the equilibrium speed of the governor 4; that is, the engine speed which the governor will attempt to maintain constant by the control exerted over the associated valve or other control element of the propeller pitch control mechanism in a manner well-known in the art and per se forming no part of the present invention. The pulley 11 is actuated by means of a cable 12 which is secured thereto, passing therearound and over guide pulleys 13 to a pulley 40 to which the cable is also secured by means of a connection as at 43, the pulley 40 being manually rotated to effect a remote control over the loading of the speeder spring 7 of the governor 4 by means of a novel manual control system now to be described.

Figure 3:
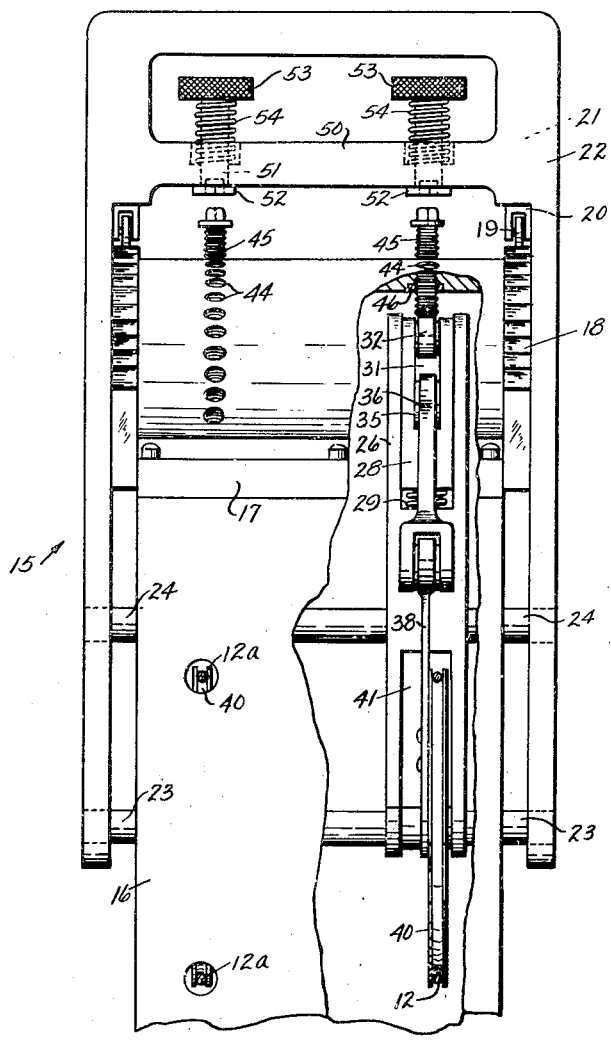
Fig. 3 is a front elevation partly in section of the manual governor adjustment means of Fig. 1.
Figure 5:
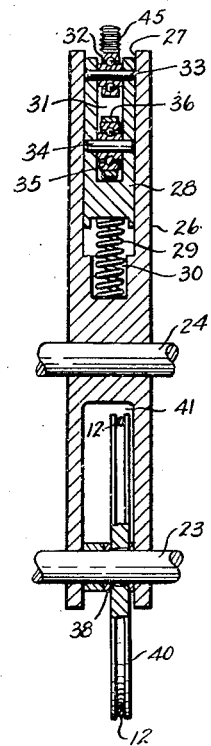
Fig. 5 is a sectional view taken on line 5—5 of Fig. 4.

The manual control device 15 of Fig. 1 is illustrated in Figs. 3, 4 and 5 and referring to Fig. 3 is seen to comprise a casing 16 having a removable closure 17 mounted on the upper end thereof and incorporating an arcuate notched sector 18 at opposite sides thereof, the notches of the sectors cooperating with roller type detents 19 which are rotatably mounted in plungers 20, loaded by springs 21, and carried by the yoke member 22 which straddles the casing 16, the yoke member being manually movable in a fore and aft direction by the pilot. The yoke or control lever 22 is mounted at its lower end on a rotatable shaft 23 which is in turn mounted in suitable bearings provided in the casing 16. A transverse rod 24 secured to the yoke member and extending through slots 25 (see Fig. 4) is employed to transfer motion from the yoke member 22 to the control mechanism as best illustrated in Figs. 4 and 5.

As seen in Figs. 3 and 4, the rod 24 passes through a yoke 26, two of which are provided for transmitting movement to the separate propeller pitch control mechanisms, yoke member 26 being slotted at its upper end as at 27 (see Fig. 5) to actuate a radially reciprocable crosshead 28, the crosshead being urged radially outward by means of a spring 29 seated in a bore 30 in the yoke 26 and engaging the underside of the crosshead 28 (see Fig. 5). At its upper end the crosshead 28 is slotted as at 31 and provided with a pivot 33 on which is rotatably supported a roller 32 in the form of a ball bearing, the crosshead 28 also being provided with a second pivot 34 in which is fitted a bearing 35 serving as a journal for the inner end of a link 36, the link 36 at its outer end being pivoted as at 37 to a radially extending link or arm 38 which is freely rotatably mounted on the shaft 23. The link 38 is rigidly secured to a pulley 40 also freely rotatably mounted on the shaft 23 and positioned in a slot 41 formed in the lower end of the yoke 26 so that the latter can straddle the pulley 40. It will be seen by reference to Fig. 4 that if the crosshead 28 was prevented from moving radially, rotation of the yoke 26 would transmit through links 36 and 38, an equal angular rotation to the pulley 40, while if the crosshead 28 is moved upward or downward from a mean position, links 36 and 38 will cause an additional motion of pulley 40 about the shaft 23 in addition to the rotation thereof due to angular movement of the yoke 26, and by causing a movement of the crossheads 28, it is possible to impart a compensating movement to each respective pulley 40.

The yoke 26, crosshead 28, roller 32, links 36 and 38 and pulleys 40 are provided in a duplicate assembly, each operative to transmit motion to a respective control cable 12 or 12a and each is provided with its own compensating mechanism which includes a plurality of tapped holes 44 arranged in the respective planes of movement of the rollers 32 into which tapped holes are threaded a number of adjustable screws 45 whose adjustment is retained by means of inserted fiber lock washers or the like such as indicated at 46 (Fig. 4). The center lines of the adjustable screws 45 are so arranged as to correspond to the position of the detent notches 18 and the number of screws corresponds to the number of separate detent notches, which in turn determine the number of possible speed settings of the respective governors. Since the screws 45 are adjustable in a radial direction with respect to the axis of rotation of shaft 23, radial adjustment of the screws will cause the lower ends thereof to define an arcuate band of contact for the rollers 32, the radial distance of which may vary from point to point as the yokes 26 are rotated about the shaft 23. The adjustment of the point of contact of the lower end of each screw 45 with the associated roller 32 is determined by means of separate wrenches incorporated in the control handle on yoke 22 (see Fig. 3) and which wrenches include short vertical shafts 51 rotatably mounted in a transverse cross piece 50 formed integral with the upper end of the control yoke 22, the shafts 51 are provided at their lower ends with wrench socket means 52 and at their upper ends with adjusting knobs 53, the wrench heads 52 being normally elevated out of contact with the square ends of the screws 45 by means of springs 54. By pushing downward on the knobs 53 and rotating the same, the adjustment of the screws 45 can be adjusted at the will of the pilot.

Operation

In order to employ the compensating mechanism of the invention, the pilot, after getting the airplane into the air, sets the throttle for cruising speed and he then moves the propeller pitch control setting lever 22 to the maximum high R. P. M. position as indicated in Fig. 4, and he then adjusts the radial position of the first screw 45 of one series by means of the associated wrench 53 until the engine speed as indicated on the corresponding engine tachometer reads a desired maximum value. The adjustment of the first screw 45 of a group associated with a particular engine causes, through contact with roller 32, a movement of the crosshead 28, relative to yoke 26, which movement is transmitted by means of link 36 to link 38 and which in turn causes rotation of the associated pulley 40 to act through the cable control mechanism on the associated speeder spring adjustment means as described with reference to Fig. 2. When the maximum speed setting has been properly determined, the control lever 22 is moved forward one notch and the next screw 45 is adjusted by means of the rotation of the knob 53 until the next speed setting is at the desired value, and this procedure is followed until the engine speed for each position of the control lever 22 is determined as being at the desired value. The pilot then, by means preferably of a mechanical stroboscope such as the "Rotoscope," observes the propeller of the one engine already calibrated, and starting from the maximum high R. P. M. position he adjusts the Rotoscope until the propeller of the first calibrated engine appears to remain stationary, and he then observes the propeller of the uncalibrated engine and by means of adjusting the corresponding screw 45 of the set associated with the uncalibrated engine in the manner previously described, he adjusts the position of the same until the propeller of the uncalibrated engine appears to remain stationary so that the pilot then knows that both engines are in synchronism as to speed for this particular setting of the control lever 22, and proceeding in an identical manner the uncalibrated engine is brought into synchronism for each position of the control lever 22. After having calibrated both engines, the pilot need not again perform any re-calibration unless the beat note indicative of lack of synchronism appears, and from actual tests, there appears to be no necessity to again re-calibrate the engines until the next overhaul period. After once having been calibrated in each position of the control setting lever 22, the crossheads 28 (Figs. 4 and 5) will be moved upward or downward an amount just sufficient to vary the loading of the governor speeder spring of the associated governor to compensate for the variations in characteristics between the respective engine governors and also to compensate for any variation in speed caused by friction, leakage and other factors in the propeller pitch control mechanism; that is, the loading of each respective governor is so determined that the engine speed in any particular setting of the manual control lever 22 will be alike for all engines on the airplane, and due to the fact that characteristics of each respective governor does not vary in any appreciable amount over a long period of time, the compensation when once determined, will thereafter remain substantially constant. By thus determining for each setting of the control lever 22, the exact amount of compensation needed in order to synchronize all engines as to speed, the pilot has formed a compensating cam surface defined by the ordinates of the underfaces of the screws 45 so that the cam surface introduces exactly the right amount of compensation. Since the control lever 22 is positioned only in the positions predetermined by the sector notches 18, it is not necessary to employ a continuous cam surface, and hence, the screws 45 serve the desired purpose, although it is obvious that a flexible band contacting the underfaces of the screws 45 might be interposed to contact the roller 32 to make a smoother transition from one adjusted position to the next, though from actual practice such a flexible band has not been determined as being necessary.

By providing the compensating mechanism and calibrating the same as above described, all of the engines will operate at the same corresponding speed for each respective setting of the control lever 22 and due to the fact that the slope of the characteristic curve for each governing system remains constant throughout the normal governing range, each engine will be controlled an equal amount for the same change in load so synchronism will be maintained under varying load, and even though a temporary lack of synchronism may occur under conditions of non-symmetrical load distribution on the engines occurring in turning flight, synchronism will be restored when the load distribution becomes symmetrical.

It will be evident that the invention is also applicable to controlling a plurality of prime movers where the governors act on throttle valves rather than through load varying mechanism, and such an application is deemed to be within the scope of the invention.

Although the compensating control mechanism has been described and illustrated as applied to a two-engine synchronizing system, it is obvious that as many separate units may be employed as there are engines to be controlled, each of the additional units being incorporated in the control device 15 for simultaneous actuation by means of the control member 22, and it is further obvious that in place of incorporating the compensating mechanism with the manual control lever 22, the compensating mechanism might be inserted between the pulley 11 and shaft 10 (Figs. 1 and 2) to transmit the compensated movement directly to the shaft 10, and it is to be understood that while the invention contemplates such a structural modification of the invention, the preferred form is as illustrated in the drawings since in the latter form the adjustment can be carried out by the pilot while in flight.

While a preferred form of the invention has been illustrated and described, various modifications and variations thereof will be recognized by those skilled in the art as falling within the scope of the invention defined in the appended claims.

I claim:

1. A means for synchronizing a plurality of prime movers as to rotational speed, said prime movers each being provided with speed responsive governing means including a governor modifier and a setting means for the modifier; said setting means having means to hold it in any one of a plurality of positions; each governing means being constructed similarly to the others but having such manufacturing variations or imperfections as will affect the speed of the prime mover governed thereby; said synchronizing means including a motion transmitting modifying means inserted between each prime mover governor modifier and the setting means therefor; and cam means associated with each said motion transmitting means and operative to vary the actuation of the associated modifier by an amount sufficient to compensate for the variance in speed of the corresponding prime mover from the speed of the prime mover selected as a standard, in each corresponding position of said setting means, whereby when each setting means is in any one of its positions all the prime movers will be maintained substantially in synchronism.

2. In a control system for regulating the speed of a plurality of engines of the character wherein each engine is provided with a separate speed responsive device for controlling the variation in speed thereof from a predetermined equilibrium value, and each of said speed responsive devices including a modifier having an element thereof movable to vary the equilibrium speed setting of the associated speed responsive device; the combination of a single setting lever movable between predetermined limits, separate motion transmitting means interconnecting said lever and the movable element of each respective modifier, and each of said motion transmitting means being composed of parts including a cam, a cam follower and means actuated by the cam follower for varying the relative positions of certain parts of the motion transmitting means in an amount sufficient to actuate the modifier of the associated speed responsive device to maintain the equilibrium speed setting of each prime mover at the same corresponding value in all adjusted positions of said setting lever.

3. The structure as claimed in claim 2, in which each cam is adjustable to vary the contour thereof in each respective position of said cam follower sufficient to vary the movement transmitted from said setting lever to said modifier in an amount to compensate for any difference of the equilibrium speed from a desired predetermined value.

4. The structure as claimed in claim 2, in which each of said motion transmitting means includes means for directly transmitting movement to said modifier movable element, means including a pair of pivoted links for transmitting angular motion of said setting lever to the means for directly transmitting movement to the modifier movable element, and means for transmitting movement of said cam follower in a plane normal to the point of tangency with said cam through said links to apply a compensating movement to said means for directly transmitting motion to said modifier movable element.

5. The invention according to claim 2, wherein means is provided to hold the setting lever in any one of a plurality of positions between said limits; each cam consisting of a plurality of members on a support, said members being individually adjustable to vary the contour of the cam; there being as many of said members as there are positions for holding the setting lever; each cam follower contacting a separate cam member for each position of the setting lever.

6. The invention according to claim 2, wherein each cam consists of a plurality of members extending radially relative to the axis of swing of the setting lever, and a support in which said members are carried so as to be individually adjustable radially in either direction; the cam follower contacting the inner ends of the several members as the setting lever is moved between said limits; said members having outer ends adapted to be turned by wrenches; and wrench members carried on the setting lever and manually movable to engage said outer ends to turn the cam members to adjust the same.

7. In a manual control device for simultaneously actuating a plurality of governor modifiers of the type in which each modifier includes a shiftable abutment adapted to vary the loading of an associated governor speeder spring and having a rotatable means associated with said abutment for shifting the same; in combination a single manual control lever angularly movable between predetermined limits, a plurality of levers angularly rotatable with said setting lever and each associated with a respective governor modifier, a plurality of crossheads each associated with a respective one of said plurality of levers and radially slidable thereon, a separate rotatable element associated with each of said plurality of levers and operatively connected to a respective rotatable means for actuating a speeder spring shiftable abutment, a toggle linkage interconnecting each of said crossheads and the associated rotatable element, a cam follower operatively associated with each respective crosshead to move the same, a cam having a calibrated contour associated with each respective cam follower and adapted to determine the radial position of the associated cam follower and connected crosshead from a mean position and yielding means for constantly urging each cam follower into contact with its associated cam.

8. The structure as claimed in claim 7, in which the contour of each of said cams is adjustable.

9. In a system for governing and synchronizing a plurality of similar prime movers each having a separate governor for controlling the speed thereof, and each governor having an adjustable modifier for varying the equilibrium speed setting thereof, in combination, a single manual control lever, movable between predetermined limits, a plurality of motion transmitting means each interconnecting a respective governor modifier and said lever, and separate means associated with each of said motion transmitting means for varying the magnitude of the motion transmitted to the associated governor modifier in accordance with the displacement of said lever from one of the limiting positions thereof, the adjustment of each governor modifier for each position of said control lever being an amount sufficient to bring the equilibrium speed of each prime mover to the same predetermined value.

HOWARD H. COUCH.